United States Patent
Clark et al.

(10) Patent No.: US 12,123,455 B2
(45) Date of Patent: Oct. 22, 2024

(54) PRE-CAPTURED PUSH RETAINER

(71) Applicant: Illinois Tool Works Inc., Glenview, IL (US)

(72) Inventors: Chad M. Clark, Stamping Ground, KY (US); Michael Fullerton, Clarkston, MI (US)

(73) Assignee: Illinois Tool Works Inc., Glenview, IL (US)

( * ) Notice: Subject to any disclaimer, the term of this patent is extended or adjusted under 35 U.S.C. 154(b) by 253 days.

(21) Appl. No.: 17/723,131

(22) Filed: Apr. 18, 2022

(65) Prior Publication Data

US 2022/0341447 A1 Oct. 27, 2022

Related U.S. Application Data

(60) Provisional application No. 63/231,749, filed on Aug. 11, 2021, provisional application No. 63/180,366, filed on Apr. 27, 2021.

(51) Int. Cl.
*F16B 5/06* (2006.01)
*B21D 22/02* (2006.01)

(52) U.S. Cl.
CPC ............. *F16B 5/065* (2013.01); *B21D 22/02* (2013.01); *F16B 5/0664* (2013.01); *F16B 5/06* (2013.01)

(58) Field of Classification Search
CPC .......... F16B 5/06; F16B 5/065; F16B 5/0664; F16B 5/125; F16B 21/06; F16B 21/18; F16B 37/02; F16B 37/04; F16B 37/08; F16B 37/0842; F16B 37/0857; F16B 39/14; B21D 22/02; Y10S 411/918

USPC ................. 411/516, 511, 517, 520–521, 523
See application file for complete search history.

(56) References Cited

U.S. PATENT DOCUMENTS

| | | | | | |
|---|---|---|---|---|---|
| 1,328,488 | A | * | 1/1920 | Bowden | F16K 27/12 |
| | | | | | 411/521 |
| 2,140,441 | A | * | 12/1938 | Clark | H01J 19/42 |
| | | | | | 70/370 |
| 2,140,443 | A | * | 12/1938 | Clark | H05K 7/12 |
| | | | | | 248/27.3 |
| 2,141,878 | A | * | 12/1938 | Roby | H05K 7/12 |
| | | | | | 411/521 |
| 3,032,807 | A | * | 5/1962 | Lanius, Jr. | F16B 21/20 |
| | | | | | 411/517 |
| 3,394,747 | A | * | 7/1968 | Duffy | F16B 41/00 |
| | | | | | 411/353 |
| 6,227,785 | B1 | * | 5/2001 | Kilgore | F16B 2/241 |
| | | | | | 411/521 |
| 7,731,446 | B2 | * | 6/2010 | Prause | B60N 2/1615 |
| | | | | | 411/521 |

(Continued)

*Primary Examiner* — Roberta S Delisle
(74) *Attorney, Agent, or Firm* — McAndrews, Held & Malloy, Ltd.

(57) ABSTRACT

Disclosed are systems and methods for coupling a first panel to a second panel via a push retainer. The push retainer includes an annular body, flexible tabs, and legs. The annular body has a topside surface and an underside surface. The annular body defines an opening. The flexible tabs are coupled to the annular body and canted upwardly away from the topside surface at a first angle. The flexible tabs are configured to engage a post of the second panel. The legs extend downwardly away from the underside surface at a second angle. The legs are configured to engage the first panel to form a part-in-assembly (PIA) component when inserted through the opening.

20 Claims, 9 Drawing Sheets

(56) References Cited

U.S. PATENT DOCUMENTS 9,227,542 B2 * 1/2016 Mayer .................... B60N 2/682

* cited by examiner

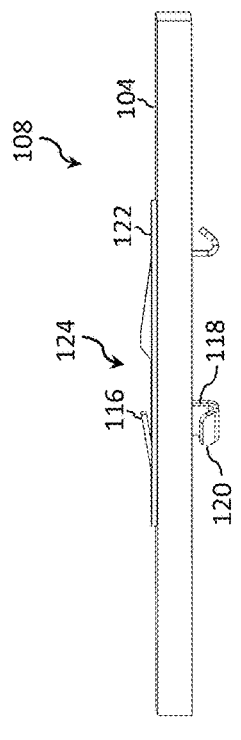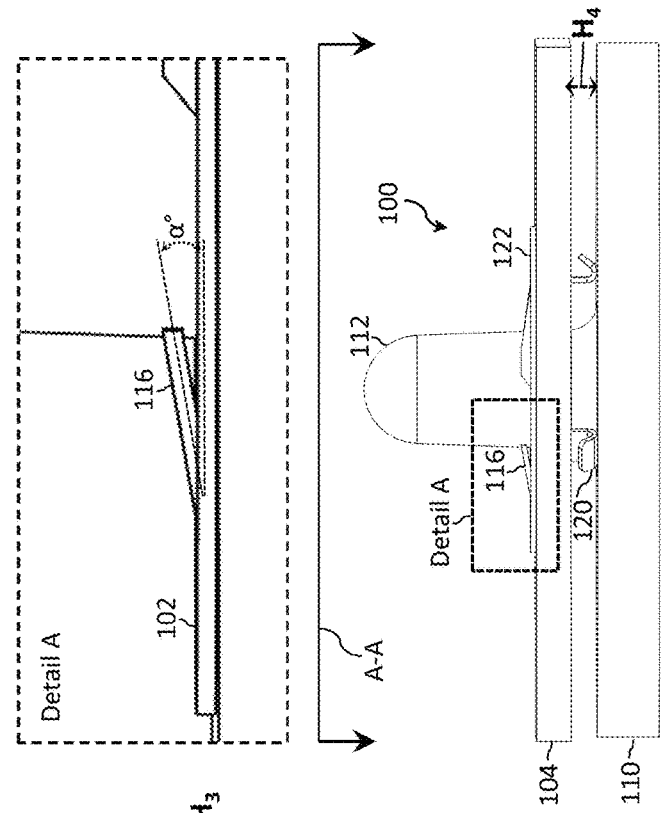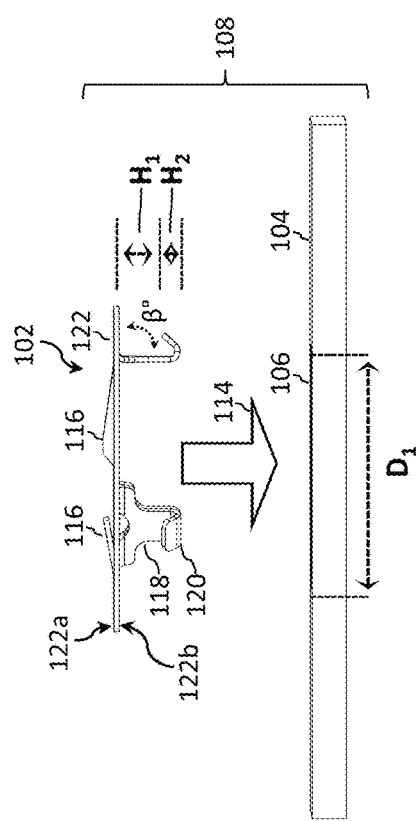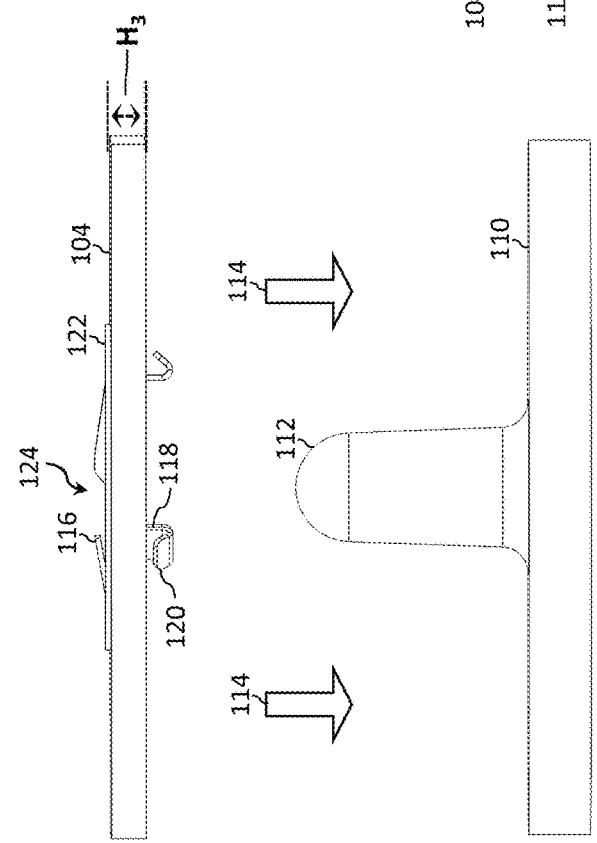

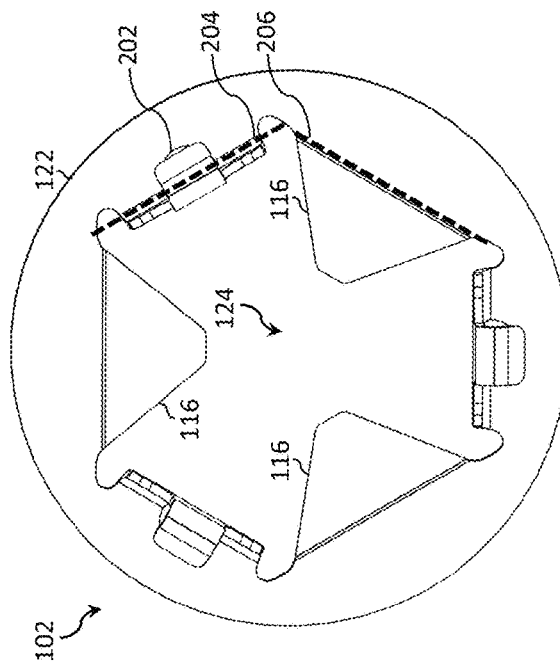
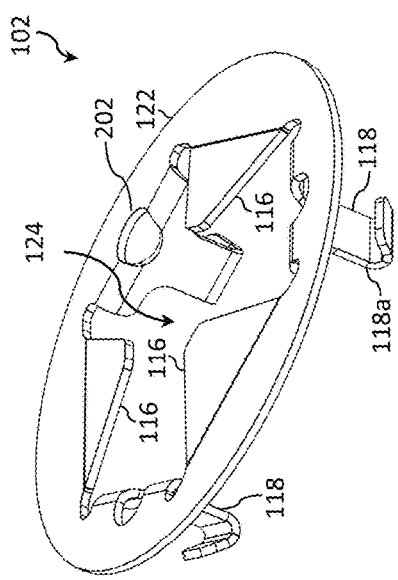
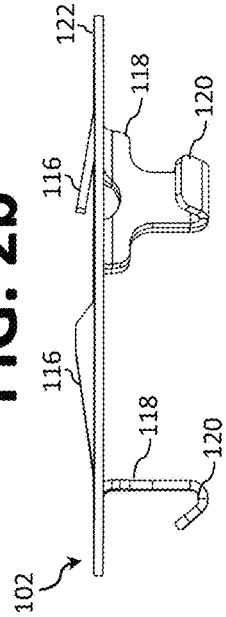
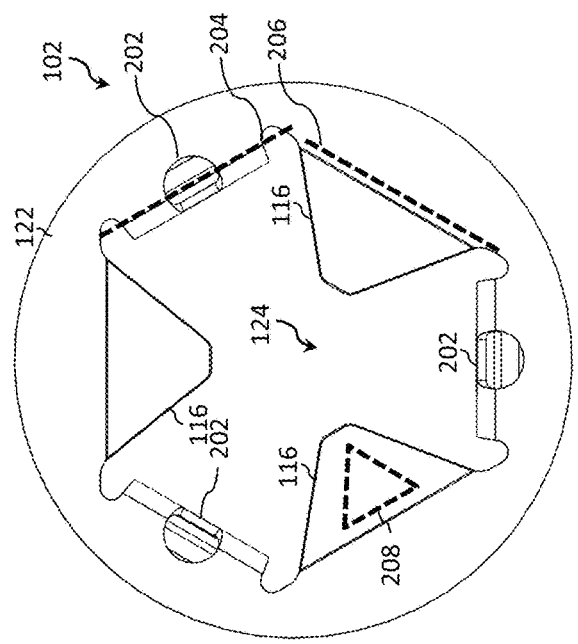
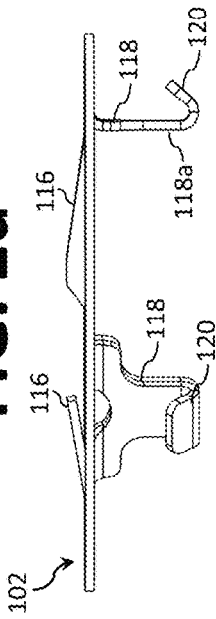
FIG. 2a
FIG. 2b
FIG. 2c
FIG. 2d
FIG. 2e

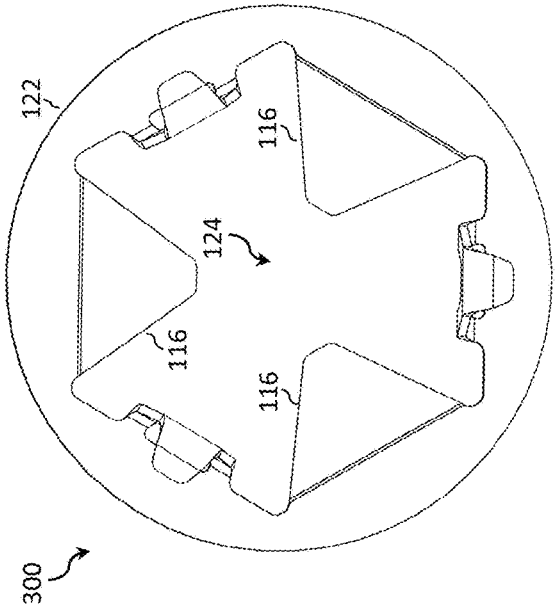
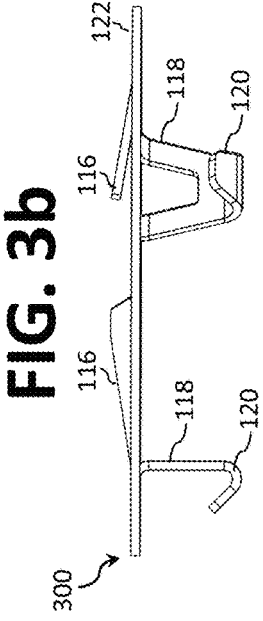
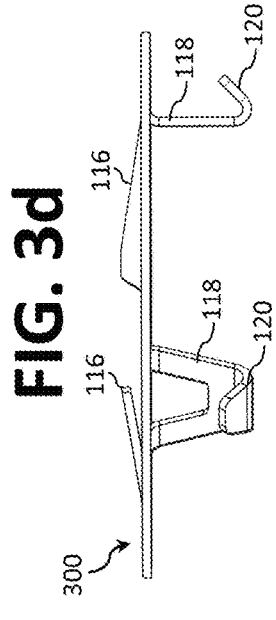
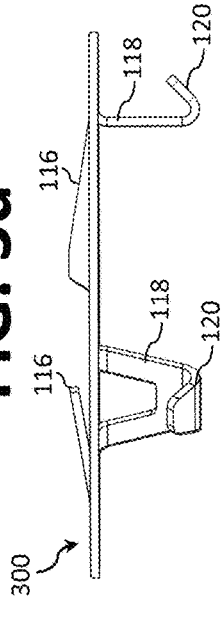
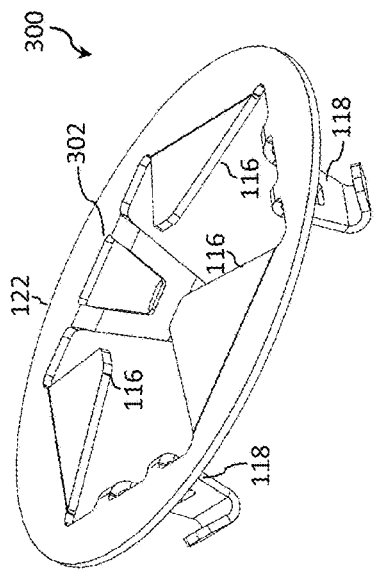
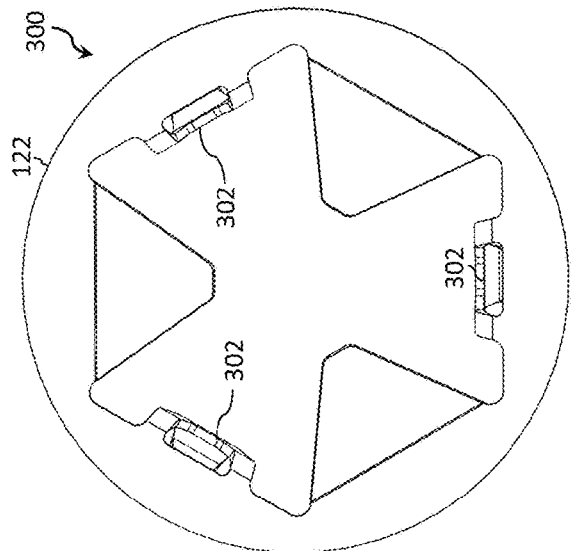
FIG. 3a  FIG. 3b  FIG. 3c  FIG. 3d  FIG. 3e

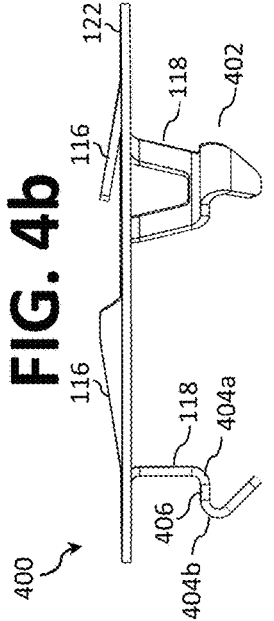
FIG. 4b
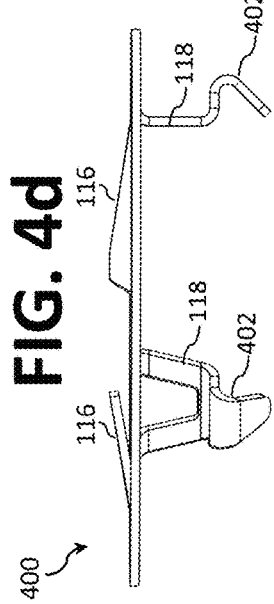
FIG. 4d
FIG. 4e
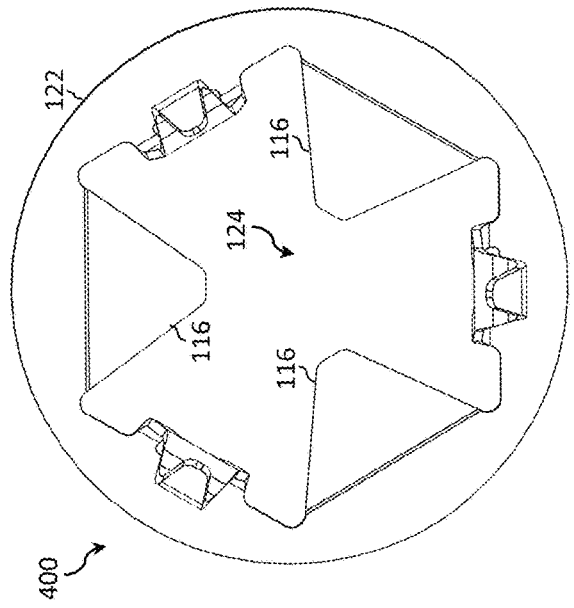
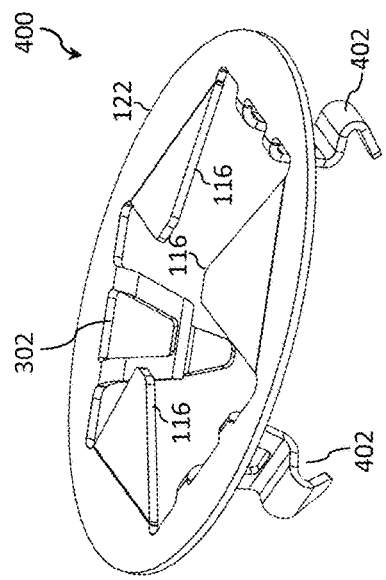
FIG. 4a
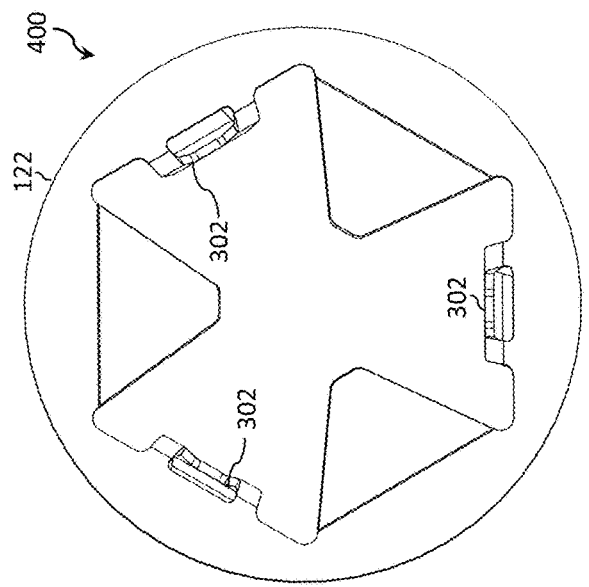
FIG. 4c

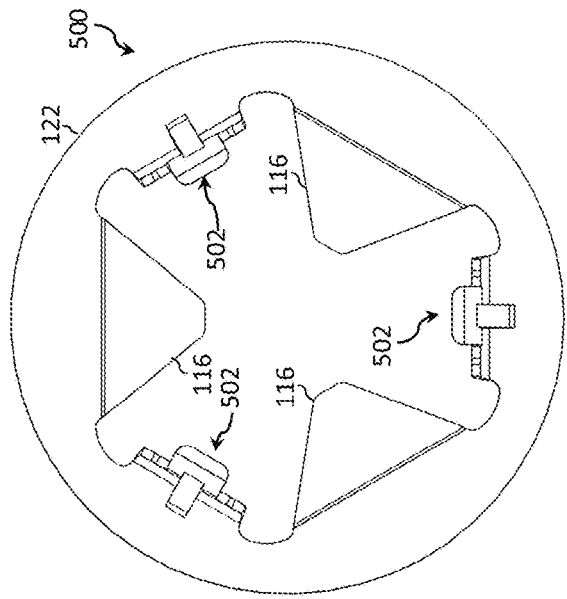
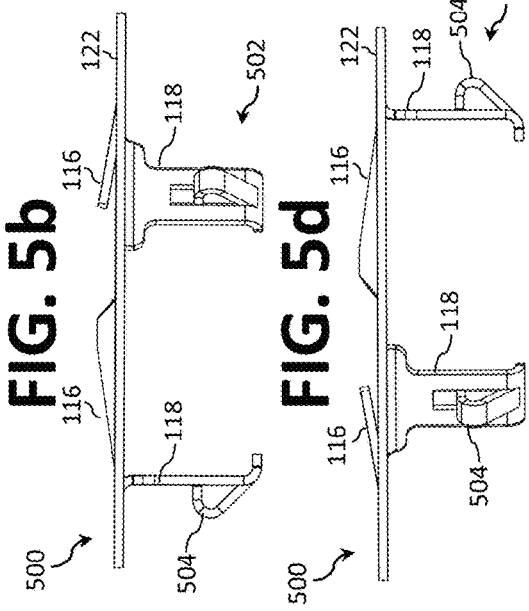
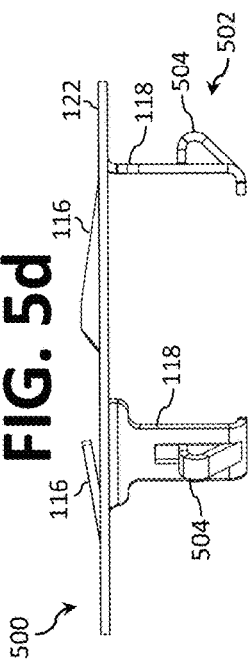
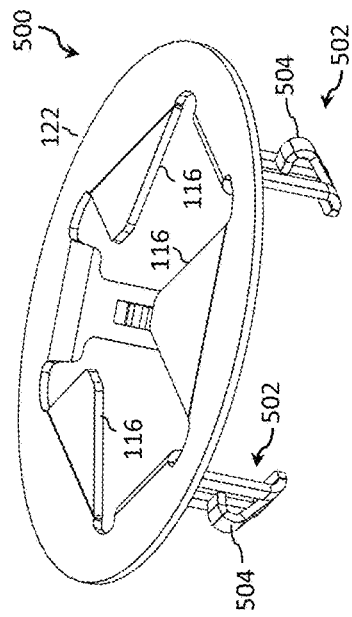
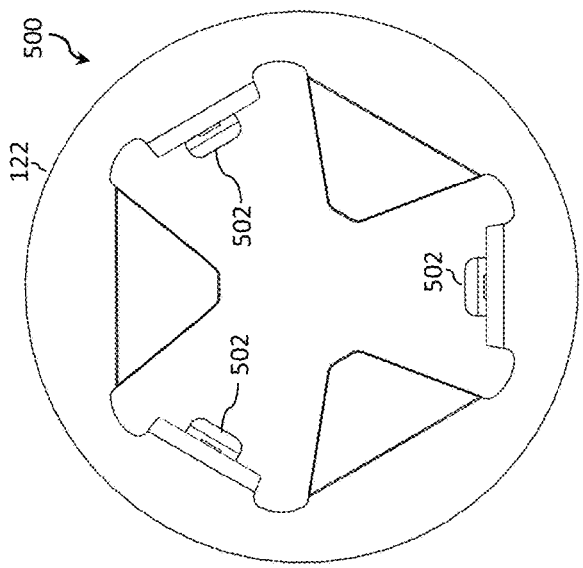

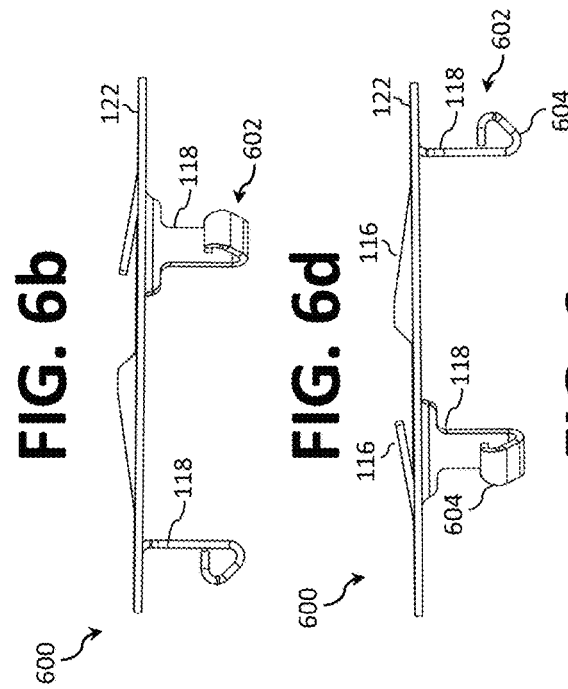
FIG. 6b
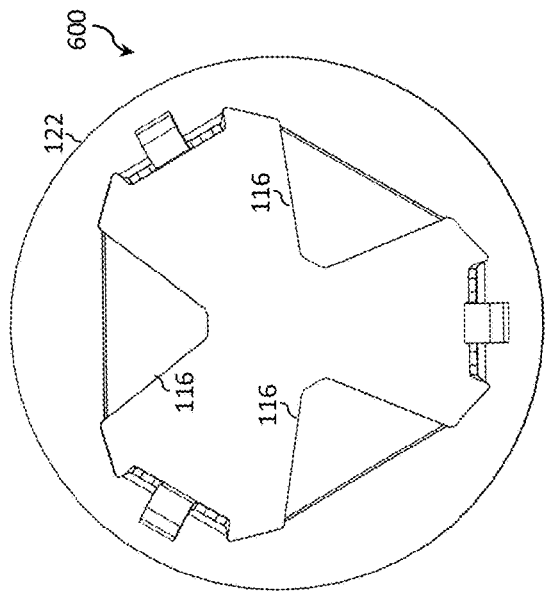
FIG. 6d
FIG. 6e
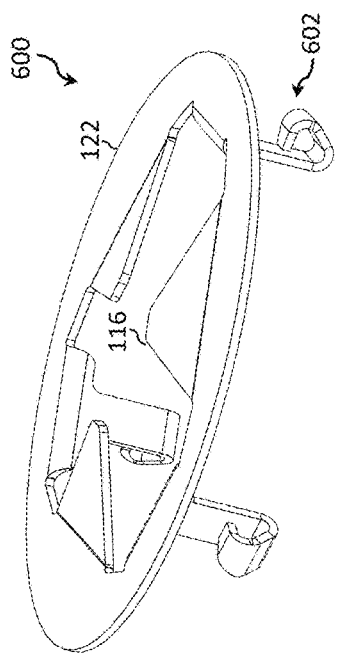
FIG. 6a
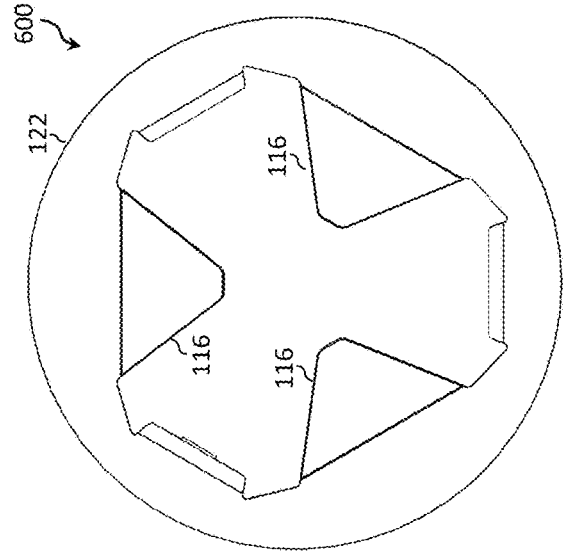
FIG. 6c

PRE-CAPTURED PUSH RETAINER

CROSS-REFERENCE

The present application claims the benefit under 35 U.S.C. § 119(e) of U.S. Provisional Patent Application Ser. Nos. 63/180,366, filed Apr. 27, 2021, and 63/231,749, filed Aug. 11, 2021; each of which is entitled "Pre-Captured Push Washer Retainer." The contents of each of the foregoing applications are hereby incorporated by reference.

BACKGROUND

Automotive components require fastening techniques that are simple to manufacture and assemble. Further, fastening techniques should above all be reliable and efficient. In order to secure a secondary panel to a primary panel, a push retainer may be used to engage a post.

To increase assembly time for the end-user, the push retainer may be pre-attached to the secondary panel at the factory to define a part-in-assembly (PIA) before shipment to the end-user. Currently, adhesives (e.g., glue, double-sided tape, etc.) are used to attach standard style push retainers to the component. Adhesives, however, increase cost and introduce additional manufacturing steps. Other options include insert-molding a push washer into the component; a process that likewise introduces additional manufacturing steps (e.g., handling, aligning, and over molding the push washer).

Therefore, despite various advancements to date, it would nevertheless be desirable to provide a push retainer that can be used with such secondary panels to form a PIA, while not otherwise impacting subsequent attachment to a primary panel by the end-user. As will be discussed, a mechanical solution can be more economical than the adhesive-based options as a mechanical solution can eliminate materials and several manufacturing steps.

SUMMARY

The present disclosure relates generally to a push retainer that may be pre-attached to a secondary panel to define a part-in-assembly, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIGS. 1a through 1d illustrate side views of an example fastening system in different stages of assembly in accordance with aspects of this disclosure.

FIG. 2a illustrates a topside isometric view of the push retainer of FIGS. 1a through 1f.

FIGS. 2b and 2c illustrate, respectively, underside and topside plan views of the push retainer.

FIGS. 2d and 2e illustrate first and second side elevation views of the push retainer.

FIGS. 3a through 3e illustrate, respectively, topside isometric, underside plan, topside plan, first side elevation, and second side elevation views of a push retainer in accordance with another aspect of this disclosure.

FIGS. 4a through 4e illustrate, respectively, topside isometric, underside plan, topside plan, first side elevation, and second side elevation views of a push retainer in accordance with yet another aspect of this disclosure.

FIGS. 5a through 5e illustrate, respectively, topside isometric, underside plan, topside plan, first side elevation, and second side elevation views of a push retainer in accordance with yet another aspect of this disclosure.

FIGS. 6a through 6e illustrate, respectively, topside isometric, underside plan, topside plan, first side elevation, and second side elevation views of a push retainer in accordance with yet another aspect of this disclosure.

DESCRIPTION

Figure 1E:
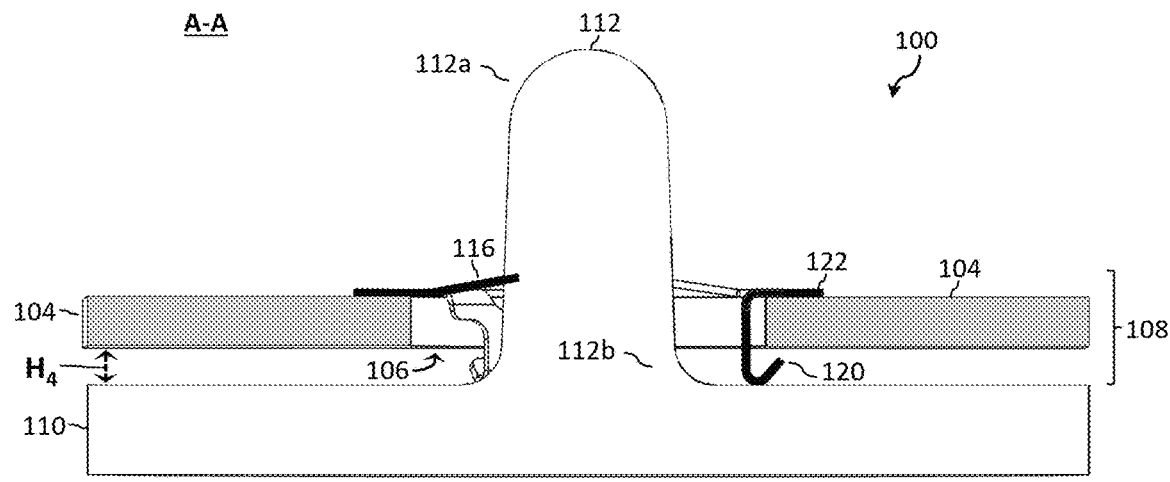
FIGS. 1e and 1f illustrate cross sectional views of the assembly fastening system of FIGS. 1a through 1d taken along cutline A-A.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}.

In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Disclosed is a push retainer configured to secure a component (e.g., a first panel) onto a post or stud of another component (e.g., a second panel); such push retainer can be pre-captured into the first panel to yield part-in-assembly (PIA) arrival to an assembly line. In one example, a push retainer to couple a first panel to a second panel via a post associated with the second panel comprises an annular body, one or more flexible tabs, and one or more legs. The annular body having a topside surface and an underside surface, wherein the annular body defines an opening. The one or more flexible tabs coupled to the annular body canted upwardly away from the topside surface at a first angle. The one or more flexible tabs are configured to engage the post and the one or more legs extend downwardly away from the underside surface at a second angle. The one or more legs are configured to engage the first panel. The push retainer can be connected to a first panel to form a part-in-assembly (PIA) component. In some examples, each of the one or more legs includes an engagement feature configured to engage the first panel. The engagement feature can be a J-shaped clip, a b-shaped clip, or the like. In some examples, the engagement feature is a tab formed in the one or more legs and extends outwardly from the respective one of the one or more legs to engage the first panel. In some examples, a distal end of each of the one or more legs is bent to form a ledge that engages the first panel. In some examples, the one or more legs are configured to engage the first panel via a panel opening formed in the first panel, which may be positioned at a center of the annular body. In some examples, each of the one or more legs includes a cutout to decrease insertion force needed to install the push retainer. In some examples, each of the one or more flexible tabs includes a cutout to decrease insertion force needed to insert the post through the opening. In some examples, the opening is positioned at a center of the annular body and the one or more flexible tabs extend inwardly toward a center of the opening. In some examples, the first angle is between about 5 and 15 degrees and the second angle is between about 85 and 95 degrees. In some examples, the push retainer is a stamped metal push retainer.

In another example, a method of manufacturing the push retainer comprises: stamping a sheet of metal to form a die cutout for the push retainer, wherein the die cutout resides in a plane and is shaped to define the annular body, the one or more flexible tabs, and the one or more legs; bending, in a first direction, each of the one or more flexible tabs to a first angle relative to the plane, wherein each of the one or more flexible tabs is configured to engage the post; and bending, in a second direction that is opposite the first direction, each of the one or more legs to a second angle relative to the plane, wherein each of the one or more legs is configured to engage the first panel via an engagement feature.

Figure 1F:
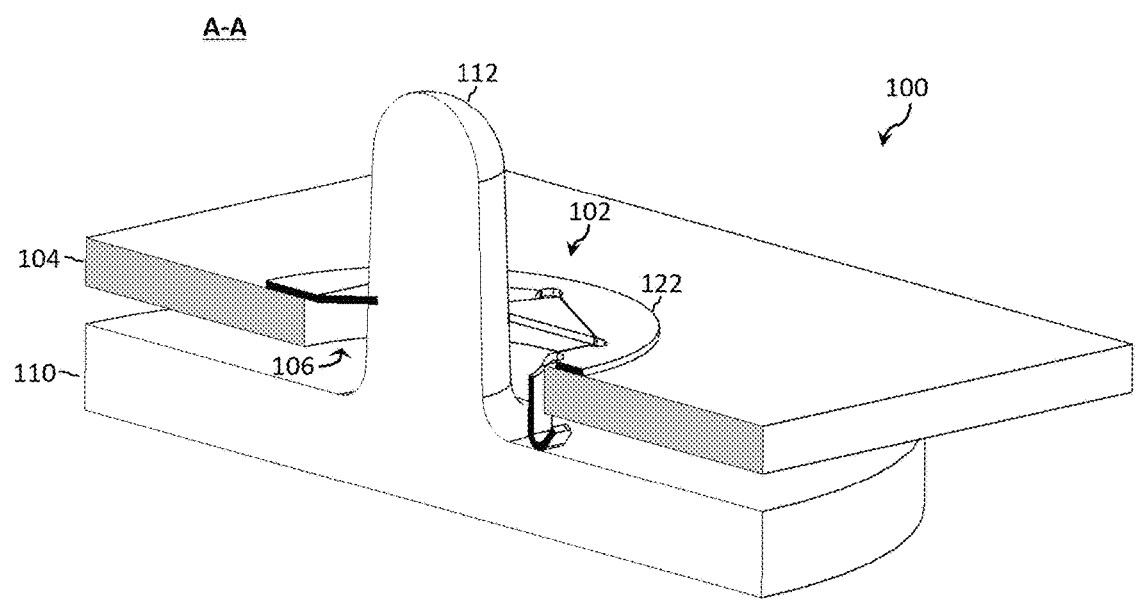

FIGS. 1a through 1d illustrate side views of an example fastening system 100 in different stages of assembly, while FIGS. 1e and 1f illustrate cross sectional views of the assembly fastening system 100 taken along cutline A-A. As illustrated, the fastening system 100 includes a push retainer 102 configured to join a first panel 104 to a second panel 110 via a post 112 (or stud) associated with the second panel 110. Specifically, FIG. 1a illustrates a first panel 104 with a push retainer 102 being inserted into a panel opening 106 to define a part-in-assembly (PIA) component 108, while FIG. 1b illustrates the assembled PIA component 108. FIG. 1c illustrates the PIA component 108 being slipped over the post 112 of the second panel 110, while FIG. 1d illustrates the PIA component 108 fully assembled with a second panel 110. The PIA component 108 may be pre-assembled at the factory and shipped to an end-user for final assembly with the first panel 110.

The first panel 104 and the second panel 110 may be, for example, automotive panels. Depending on the application, the first panel 104 and/or the second panel 110 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. In the automotive industry, example first panels 104 include, without limitation, door trim panels, moldings, trim pieces, and other substrates (whether used as interior or exterior surfaces). The second panel 110 can be a structural component of a vehicle, such as a hood, doors, pillars (e.g., an A-pillar, B-pillar, C-pillar, etc.), dashboard components (e.g., a cross member, bracket, frame, etc.), seat frames, center consoles, fenders, sheet metal framework, or the like. In some examples, the push retainer 102 can be used for attachment of noise and/or heat insulating materials (as a first panel 104) in an automotive application onto a post 112 of a second panel 110.

The first panel 104 includes one or more panel openings 106 configured to receive the push retainer 102, while the second panel 110 includes one or more posts 112 configured to engage the one or more push retainers 102. As illustrated, each of the one or more posts 112 is generally perpendicular to the second panel 110. The push retainer 102 may be fabricated from a generally rigid material, such as metal, synthetic or semi-synthetic polymers, composite materials, or a combination thereof. In some examples, as will be discussed, the push retainer 102 is fabricated from a sheet of metal using a metal stamping and bending process.

As illustrated, the push retainer 102 is configured as a push washer retainer and generally includes an annular body 122 that defines an opening 124, one or more flexible tabs 116 to engage the post 112, and one or more legs 118 to engage the first panel 104. In some examples, the annular body 122 generally resembles a washer—i.e., a circular flat body with the opening 124 (illustrated as a circular opening) at the center of the circular flat body. During assembly, the annular body 122 provides a flat, planar surface that allows a tool to push the push retainer 102 onto the post 112. In use, the push retainer 102 can be pre-captured into a first panel 104 (or another component) as a PIA component 108 that is to be installed by pushing onto posts 112 on a second panel 110.

The flexible tabs 116 are formed from or on the annular body 122 and canted upward. While three are illustrated, the number of flexible tabs 116 around the inner diameter of the opening 124 of the annular body 122 can be increased or decreased based on the retention and insertion forces needed (or desired) relative to the post 112. In the illustrated example, the one or more flexible tabs 116 extend inward toward a center of the opening 124 and are canted upwardly away from the topside surface 122a of the annular body 122 at angle α (as best illustrated in Detail A of FIG. 1d). Further, while illustrated as generally trapezoidal, the general shape of the flexible tabs 116, including length, width, and thickness can be varied to change push-on and retention forces.

The distal ends of the flexible tabs 116 are designed to engage and hold onto a post 112 via interference fit at or near the center of the opening 124. The flexibility and angle (angle α) of the flexible tabs 116 provides tolerance compensation for slightly different sized posts 112. The angle α may be for example, between 5 and 20 degrees, 5 and 15 degrees, or about 10 degrees. In some examples, cutouts can be added to the flexible tabs 116 to reduce the forces and allow for more flexibility — an example of which is illustrated in FIG. 2c.

The one or more legs 118 are formed from or on the annular body 122 and extend downwardly away from the underside surface 122b of the annular body 122 at an angle (angle β). While three are illustrated, the number of legs 118 around the inner diameter of the opening 124 of the annular body 122 can be increased or decreased based on the retention and insertion forces needed (or desired) relative to the first panel 104. Further, the general shape of the legs 118, including length, width, and thickness can be varied to change push-on and retention forces. In some examples, there may be a gap (e.g., a shear cut) between the legs 118 and flexible tabs 116.

The flexibility and angle (angle β) of the legs 118 provides tolerance compensation for slightly different sized holes. The angle (angle β) may be, for example, between 85° and 95°, or about 90° such that each of the one or more legs 118 is generally perpendicular to a plane defined by the underside surface 122b of the annular body 122.

The bottom outer diameter of the legs 118 are retained via an interference fit with the panel opening 106 in the first panel 104. As illustrated, each of the one or more legs 118 includes an engagement feature 120 to secure the push retainer 102 to the first panel 104 via the panel opening 106 (e.g., to snap or clip thereto). To that end, a distal end 118a of each leg 118 is shaped with or otherwise includes an engagement feature 120 to enable the push retainer 102 to be pre-captured in the first panel 104.

The annular body 122, one or more flexible tabs 116, and one or more legs 118 may be manufactured as a single component (e.g., via a metal stamping process) or as separate components and joined thereafter (e.g., through adhesives, welding, etc.). Thus, the push retainer 102 can be a unitary structure.

In some examples, the push retainer 102 may be pre-attached to the first panel 104 to define a part-in-assembly (PIA) component 108. To form the PIA component 108, the one or more legs 118 are first passed through the panel opening 106 in the first panel 104 in the direction indicated by arrow 114 until the engagement features 120 snap to the panel opening 106, thus securing the push retainer 102 to the first panel 104. As illustrated, the annular body 122 is wider than the opening diameter ($D_1$) to prevent the entire push retainer 102 from passing through the panel opening 106.

The PIA component 108 can then be attached to the second panel 110 by pushing the PIA component 108 toward the second panel 110 as indicated by arrow 114 such that the post 112 of the first panel 104 passes through the opening 124 in the push retainer 102. The PIA component 108 is configured to engage the post 112 of the second panel 110 via the one or more flexible tabs 116. That is, the post 112 of the second panel 110 slides through the opening 124, thus securing the first panel 104 and the second panel 110 to one another. Each of the illustrated one or more posts 112 is generally conical or tapered such that the base end 112b is wider than the distal end 112a. Tapering the one or more posts 112 increases alignment tolerances during assembly while also providing a wider base end 112b to better engage the push retainer 102 post assembly and mitigate unwanted pull out.

After assembly, as best illustrated in FIG. 1d, the second panel 110 is covered at least partially by the first panel 104. The flexible tabs 116 secure the post 112 via an interference fit. By angling the one or more flexible tabs 116 upward away from the topside surface 122a of the annular body 122 at angle α, the push retainer 102 can slide over the post 112 during assembly without requiring excessive assembly force, but, once assembled, the push retainer 102 cannot easily slide off the post 112 as the angle α causes the one or more flexible tabs 116 to, in effect, dig into the post 112 at or near its base end 112b until a sufficient pull force is applied at the push retainer 102 to overcome the engagement between the one or more flexible tabs 116 and the post 112.

The leg 118 and engagement feature 120 are sized and shaped to clip onto the first panel 104, which may be dictated by the thickness ($H_3$) of the first panel 104 and the desired gap distance ($H_4$) between the first panel 104 and second panel 110 post assembly. In addition, the engagement feature 120 may be shaped to serve as a spacer, thereby providing a desired gap distance ($H_4$) between the first panel 104 and second panel 110. Providing a desired gap distance ($H_4$) between the first panel 104 and second panel 110 can mitigate buzz, squeak and rattle (BSR). For example, the height of the leg 118 may substantially equal to the thickness ($H_3$) of the first panel 104, while the height of the engagement feature 120 may substantially equal to the desired gap distance ($H_4$) between the first panel 104 and second panel 110. In some examples, the height of the leg 118 may slightly greater than the thickness ($H_3$) of the first panel 104 to increase tolerance during assembly; for example, 5 to 10% greater.

While only a single push retainer 102, a single panel opening 106 in the first panel 104, and a single post 112 on the second panel 110 are illustrated in the examples, it should be appreciated that a given first panel 104 may include multiple panel openings 106 and the second panel 110 may include multiple posts 112, depending on the number of fastener points to be used between the first and second panels 104, 110. For example, larger panels typically employ more fastener points.

FIG. 2a illustrates a topside isometric view of the push retainer 102 of FIGS. 1a through 1f, while FIGS. 2b and 2c illustrate, respectively, underside and topside plan views of the push retainer 102 and FIGS. 2d and 2e illustrate first and second side elevation views of the push retainer 102. As illustrated, each of the legs 118 is folded, bent, or otherwise connected to the annular body 122 at a leg bend line 204 (or fold line), while each of the flexible tabs 116 is folded, bent, or otherwise connected to the annular body 122 at a tab bend line 206.

One or more cutouts can be provided throughout the push retainer 102 to decrease insertion forces (and to reduce material usage). For example, cutouts 202 can be provided in one or more of the legs 118 to decrease the insertion force needed to install the push retainer 102 in the panel opening 106. Including the cutouts 202 decreases rigidity of the leg 118 to thereby allow the leg 118 to more easily deflect as the engagement feature 120 passes through the panel opening 106. For example, the cutouts 202 may be circular and positioned at the leg bend line 204, i.e., where the leg 118 attaches and flexes relative to the annular body 122. In some examples, cutouts 208 (an example being represented via a broken line) may similarly be added to one or more of the flexible tabs 116 to decrease the insertion force needed to insert the post 112 through the opening 124.

In the illustrated example, the leg 118 and engagement feature 120 are J-shaped clips. More specifically, the distal end 118a of each leg 118 is bent or curved to form a ledge that clips to the first panel 104. As illustrated, the overall side profile of the leg 118 and engagement feature 120 resembles a J-shape; however, as will become apparent, other shapes and configurations are contemplated.

FIG. 3a illustrates a topside isometric view of the push retainer 300 in another example, while FIGS. 3b and 3c illustrate, respectively, underside and topside plan views of the push retainer 300 and FIGS. 3d and 3e illustrate first and second side elevation views of the push retainer 300. The push retainer 300 of FIGS. 3a through 3e is substantially the same as the push retainer 102 of FIGS. 2a through 2e except that the cutouts 302 positioned at the bend where the leg 118 attaches to the annular body 122 are larger and trapezoidal in shape.

FIG. 4a illustrates a topside isometric view of the push retainer 400 in another example, while FIGS. 4b and 4c illustrate, respectively, underside and topside plan views of the push retainer 400 and FIGS. 4d and 4e illustrate first and second side elevation views of the push retainer 400. The push retainer 400 of FIGS. 4a through 4e is substantially the same as the push retainer 300 of FIGS. 3a through 3e except that the leg 118 and engagement feature 402 are a hook-shaped clips. In the illustrated example, each of the hook-shaped clips comprises two bends 404a, 404b that from the ledge 406 and generally curved engagement feature 402. In some examples, the first bend 404a is about 90 degrees relative to the leg 118 and spaced at a distance from the annular body 122 that corresponds to the thickness of the first panel 104, while the second bend 404b is angled inward toward the center (e.g., at an acute angle relative to the leg 118) to help guide the push retainer 400 into the opening 124. When assembled, the first panel 104 is snapped between the annular body 122 and ledge 406.

FIG. 5a illustrates a topside isometric view of the push retainer 500 in another example, while FIGS. 5b and 5c illustrate, respectively, underside and topside plan views of the push retainer 500 and FIGS. 5d and 5e illustrate first and second side elevation views of the push retainer 500. The push retainer 500 of FIGS. 5a through 5e is substantially the same as the push retainer 400 of FIGS. 4a through 4e except that the engagement feature 502 also serves as a cutout to reduce insertion forces. As illustrated, the sheet metal can be stamped such that a tab 504 remains connected to the leg 118 via at least on side. The tab 504 can then be bent to form the engagement feature 502. For example, the tab 504 can then be bent or otherwise extend outwardly from the leg 118 and can be configured to engage the first panel 104.

FIG. 6a illustrates a topside isometric view of the push retainer 600 in another example, while FIGS. 6b and 6c illustrate, respectively, underside and topside plan views of the push retainer 600 and FIGS. 6d and 6e illustrate first and second side elevation views of the push retainer 600. The push retainer 600 of FIGS. 6a through 6e is substantially the same as the push retainer 500 of FIGS. 5a through 5e except that the leg 118 and engagement feature 602 are a b-shaped clips. That is, the distal end 604 of the leg 118 can be bent outward, upward, and then against the leg 118 to form the ledge that engages the first panel 104.

Figure 7A:
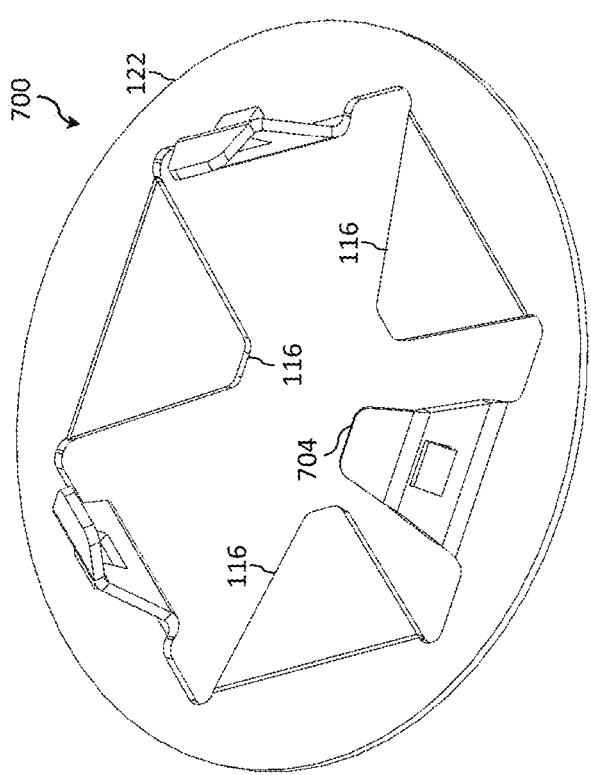
FIGS. 7a and 7b illustrate, respectively, topside isometric and side elevation views of the push retainer in accordance with yet another aspect of this disclosure.
Figure 7B:
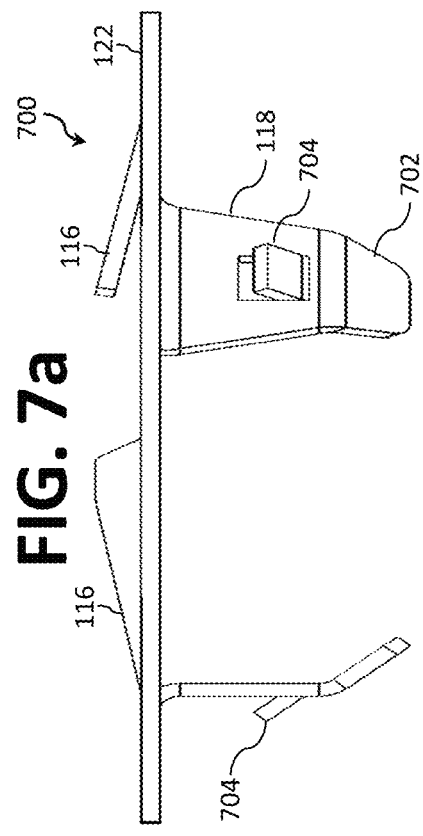

FIG. 7a illustrates a topside isometric view of the push retainer 700 in another example, while FIG. 7b illustrates a side elevation view of the push retainer 700. The push retainer 700 of FIGS. 6a through 6e is substantially the same as the push retainer 300 of FIGS. 3a through 3e except that the distal end 702 of the leg 118 is bent inward toward the post 112 (when assembled) and a tab 704 formed in the leg 118 is bent outward to engage the first panel 104. When assembled, the post 112 pushes the legs outwardly via the distal end 702, thereby causing the tab 704 formed in the leg 118 to press either into, around, or against the first panel 104.

Figure 8:
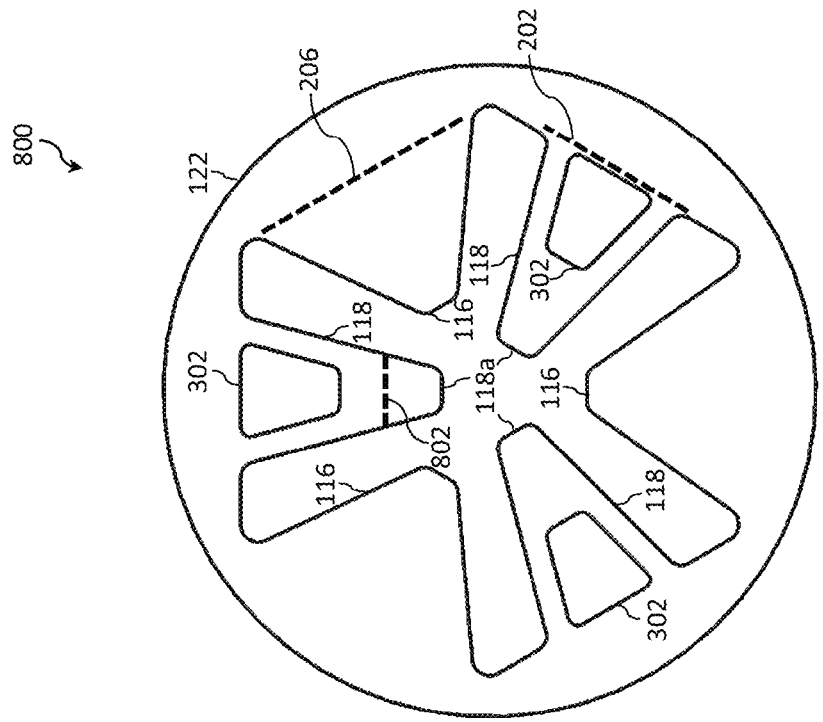
FIG. 8 illustrates a top plan view of an example die cutout for push retainer.

FIG. 8 illustrates a top plan view of an example die cutout 800. The die cutout 800 is generally planar and resides in a plane (e.g., a single plane) and is shaped to define portions that correspond to the various components of the push retainer 102, such as the annular body 122, the one or more flexible tabs 116, one or more legs 118, engagement feature 120, cutouts 302, etc. The sheet of metal may be stamped via a press and die. In other examples, the die cutout may be cut from sheet of metal using lasers, water jets, jigsaw, etc. The die cutout 800 can then be folded or bent across various fold lines to form the final push retainer. The fold lines in this example include the leg bend line 204, the tab bend line 206, and an engagement feature bend line 802. In this particular example, the die cutout 800 corresponds to the push retainer 300 of FIGS. 3a through 3e, but the same principles apply to other variants and designs.

Figure 9:
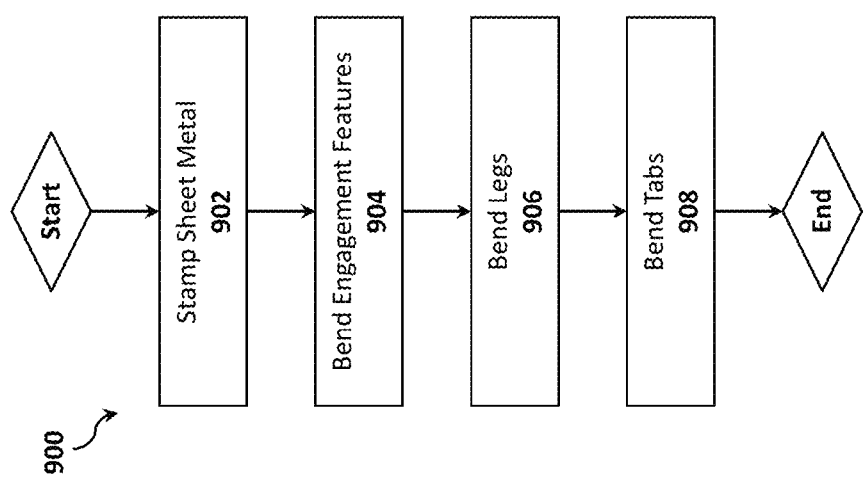
FIG. 9 is a flow chart of an example method of manufacturing a push retainer in accordance with an aspect of this disclosure.

FIG. 9 is a flow chart 900 of an example method of manufacturing a push retainer 102 to couple a first panel 104 to a second panel 110 via a post 112 in accordance with an aspect of this disclosure.

At step 902, a sheet of metal is stamped to form a die cutout (e.g., die cutout 800) for the push retainer 102.

At step 904, the engagement features 120 are formed by bending a distal end 118a of each of the one or more legs 118 to form a desired type of engagement features 120, such a J-shape, hook-shaped, b-shaped, etc. In some examples, a tab 504 can be punched in the leg 118 and bent to form a desired type of engagement features 120 instead of bending the distal end 118a across engagement feature bend lines 802; an example of which is illustrated and described in connection with FIGS. 5a through 5e.

At step 906, each of the one or more legs 118 is bent along a leg bend line 204 in a first direction to a first angle relative to the plane. The first angle may be, for example, angle ($\beta$) or the supplementary angle thereto.

At step 908, each of the one or more flexible tabs 116 is bent along a tab bend line 206 in a second direction that is opposite the first direction to a second angle ($\alpha$) relative to the plane.

The order or presentation of method steps is not intended to require this order of performing the recited steps unless a particular order is expressly required or otherwise clear from the context. For example, while steps 904, 906, and 908 are illustrated in a particular order, steps 904, 906, and 908 can be reordered to achieve a particular design need. Further, while the push retainer is described primarily as being stamped from metal (or a metal alloy), other materials are contemplated, such as synthetic or semi-synthetic polymers, composite materials, or a combination thereof. Example part materials include, inter alia, nylon (PA), polyetherimide (PEI), polyoxymethylene (POM), polypropylene (PP), high-density polyethylene (HDPE), acrylonitrile butadiene styrene (ABS), polystyrene (PS), and the like. In some examples, the push retainer 102 may be manufactured using an additive manufacturing process (e.g., 3D printing).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed:

1. A push retainer to couple a first panel to a second panel via a post associated with the second panel, the push retainer comprising:
    an annular body having a topside surface and an underside surface, wherein the annular body defines an opening;
    one or more flexible tabs coupled to the annular body and canted upwardly away from the topside surface at a first angle,
        wherein the one or more flexible tabs are configured to engage the post; and one or more legs extending downwardly away from the underside surface at a second angle,
        wherein at least one of the one or more legs are configured to engage the first panel via an engagement feature having a tab formed therein that extends outwardly from the at least one of the one or more legs.

2. The push retainer of claim 1, wherein the engagement feature is a J-shaped clip.

3. The push retainer of claim 1, wherein the engagement feature is a b-shaped clip.

4. The push retainer of claim 1, wherein a distal end of each of the one or more legs is bent to form a ledge that engages the first panel.

5. The push retainer of claim 1, wherein the one or more legs are configured to engage the first panel via a panel opening formed in the first panel.

6. The push retainer of claim 1, wherein each of the one or more legs includes a cutout to decrease insertion force needed to install the push retainer.

7. The push retainer of claim 1, wherein each of the one or more flexible tabs includes a cutout to decrease insertion force needed to insert the post through the opening.

8. The push retainer of claim 1, wherein the opening is positioned at a center of the annular body.

9. The push retainer of claim 1, wherein the one or more flexible tabs extend inwardly toward a center of the opening.

10. The push retainer of claim 1, wherein the first angle is between about 5 and 15 degrees and the second angle is between about 85 and 95 degrees.

11. The push retainer of claim 1, wherein the push retainer is a stamped metal push retainer.

12. The push retainer of claim 1, wherein the engagement feature is configured to maintain a gap distance between the first panel and the second panel.

13. A method of manufacturing a push retainer to couple a first panel to a second panel via a post associated with the second panel, the method comprising:
    stamping a sheet of metal to form a die cutout for the push retainer, wherein the die cutout resides in a plane and is shaped to define an annular body, one or more flexible tabs, and one or more legs;
    bending, in a first direction, each of the one or more flexible tabs to a first angle relative to the plane, wherein each of the one or more flexible tabs is configured to engage the post;
    bending, in a second direction that is opposite the first direction, each of the one or more legs to a second angle relative to the plane, wherein each of the one or more legs is configured to engage the first panel via an engagement feature having a tab; and
    stamping each of the one or more legs to form the tab and bending the tab away from the respective one or more legs.

14. The method of claim 13, further comprising the step of bending a distal end of each of each of the one or more legs to form the engagement feature.

15. A part-in-assembly (PIA) component configured to engage a post of a second panel, the PIA component comprising:
    a first panel having a panel opening; and
    a push retainer having an annular body, one or more flexible tabs, and one or more legs,
    wherein the annular body defines an opening and has a topside surface and an underside surface,
    wherein the one or more flexible tabs are coupled to the annular body and are canted upwardly away from the topside surface at a first angle,
    wherein the one or more legs extend downwardly away from the underside surface at a second angle, and
    wherein the one or more legs are configured to maintain a gap distance between the first panel and the second panel.

16. The PIA component of claim 15, wherein the push retainer is a stamped metal push retainer.

17. The PIA component of claim 15, wherein the one or more flexible tabs are configured to engage the post when inserted through the opening.

18. The PIA component of claim 15, wherein a distal end of each of the one or more legs is bent to form a ledge that engages the first panel.

19. The PIA component of claim 15, wherein at least one of the one or more legs is shaped as a J-shaped clip.

20. The PIA component of claim 15, wherein at least one of the one or more legs is shaped as a b-shaped clip.

* * * * *